United States Patent
Lee

(10) Patent No.: US 11,244,132 B2
(45) Date of Patent: Feb. 8, 2022

(54) BARCODE SCANNER SYSTEM OPERATING THROUGH USER FINGERPRINT AUTHENTICATION

(71) Applicant: NORIAND CO., LTD., Seoul (KR)

(72) Inventor: Hye Jin Lee, Seoul (KR)

(73) Assignee: NORIAND CO., LTD., Seoul (KR)

( * ) Notice: Subject to any disclaimer, the term of this patent is extended or adjusted under 35 U.S.C. 154(b) by 0 days.

(21) Appl. No.: 17/148,894

(22) Filed: Jan. 14, 2021

(65) Prior Publication Data
US 2021/0133412 A1    May 6, 2021

Related U.S. Application Data

(63) Continuation of application No. PCT/KR2019/004833, filed on Apr. 22, 2019.

(30) Foreign Application Priority Data

Feb. 20, 2019   (KR) .................. 10-2019-0019965

(51) Int. Cl.
*G06K 7/14* (2006.01)
*G06K 7/10* (2006.01)

(52) U.S. Cl.
CPC ....... *G06K 7/1417* (2013.01); *G06K 7/10881* (2013.01); *G06K 7/1413* (2013.01); *G06K 2007/10524* (2013.01)

(58) Field of Classification Search
CPC ............ G06K 7/1417; G06K 7/10881; G06K 7/1413; G06K 2007/10524; G06K 7/1404;
(Continued)

(56) References Cited

U.S. PATENT DOCUMENTS

2008/0164312 A1    7/2008   Do et al.
2019/0075101 A1*   3/2019   Wang .................. G06F 16/951

FOREIGN PATENT DOCUMENTS

JP          3725533 B2    12/2005
KR      1020000024492 A    5/2000
(Continued)

OTHER PUBLICATIONS

International Search Report of PCT/KR2019/004833 dated Apr. 22, 2019.

*Primary Examiner* — Matthew Mikels
(74) *Attorney, Agent, or Firm* — Dinsmore & Shohl LLP; Yongsok Choi, Esq.

(57) ABSTRACT

A barcode scanner system includes a scan unit which includes, on one surface thereof, a scan module for scanning a barcode and has, on the other surface thereof, a structure for coupling to a body unit; and the body unit which has one surface having a shape corresponding to the coupling structure of the scan unit, and includes a display module, a communication module, an operation module, and a fingerprint recognition module. The body unit recognizes fingerprint information of the user through the fingerprint recognition module, and transmits the fingerprint information to a server to perform authentication. When a user input to the operation module occurs after authentication completion information is received from the server, a barcode scan is performed, and the scanned barcode information is transmitted to the server. Barcode information and user information identified through recognition of the fingerprint information are matched and stored in the server.

15 Claims, 5 Drawing Sheets

(58) Field of Classification Search
CPC .. G06K 7/10544; G06F 21/32; H04L 63/0861
See application file for complete search history.

(56) References Cited

FOREIGN PATENT DOCUMENTS

| | | | |
|---|---|---|---|
| KR | 100722873 | B1 | 5/2007 |
| KR | 1020100015239 | A | 2/2010 |
| KR | 1020140135521 | A | 11/2014 |
| KR | 101510613 | B1 | 4/2015 |
| KR | 1020160001200 | A | 1/2016 |
| KR | 101613131 | B1 | 4/2016 |

\* cited by examiner

BARCODE SCANNER SYSTEM OPERATING THROUGH USER FINGERPRINT AUTHENTICATION

CROSS-REFERENCE TO RELATED APPLICATIONS

This application is a continuation of International Patent Application No. PCT/KR2019/004833 filed on Apr. 22, 2019 which claims priority to Korean Patent Application No. 10-2019-0019965 filed on Feb. 20, 2019.

BACKGROUND

1. Technical Field

The present disclosure relates to a system for operating a scanner after a user having a right to use is identified through fingerprint authentication.

2. Related Art

In general, a predetermined object marked to be recognizable through English letters, numbers, or special symbols is called a code. However, it is very cumbersome and difficult for a person to individually memorize the codes and input them into a computer, and it is almost impossible to handle all kinds of items such as household goods as separate codes.

In order to solve this problem, instead of a general code, a device that generates a barcode which is a type of one-dimensional code by combining bars having different thicknesses, reads the generated result optically and inputs the read result to a computer, is called as a barcode reader or barcode scanner.

As a technology advances, there are cases where a lot of pieces of information is desired to be entered with a single code, and a two-dimensional image-based QR code (quick response code) is created and used.

However, since the barcode and the QR code have different implementation principles, there is a disadvantage in that the cost of manufacturing a scanner that may recognize both types of codes increases, and the speed of recognizing codes is slow.

Meanwhile, since the barcode scanner does not have a separate authentication system, anyone can use it. Therefore, it is not easy to identify by whom the code scanned through the barcode scanner is performed.

In particular, when there are many employees who sell a specific product, a system is required to easily identify who sold which product. However, the development of a technology capable of solving the problem in connection with the current barcode scanner system, is insufficient.

In the present disclosure, in order to solve the above problems, it is possible to use a barcode scanner by identifying a user through fingerprint authentication. In addition, since it is possible to reduce a prerequisite work required to switch a module by switching a scanning module, it is an object of the present disclosure to enable rapid work in an industrial field.

SUMMARY

According to an embodiment of the present disclosure for achieving the above technical problem, a barcode scanner operated through fingerprint authentication by a user includes a scanning unit including a scan module for scanning a barcode on one side and having a coupling structure with a main body on the other side; and the main body having a shape corresponding to the coupling structure of the scanning unit on one side and including a display module, a communication module, an operation module, and a fingerprint recognition module, in which the main body recognizes fingerprint information of a user through the fingerprint recognition module, performs authentication by transmitting the fingerprint information to server, scans a barcode in a case where an input is generated to the operation module of the user after authentication completion information is received from the server, and transmits the scanned barcode information to the server, and the server matches the user information identified through recognition of the fingerprint information with the barcode information and stores the matched result.

In addition, according to an embodiment of the present disclosure, the scanning unit may be provided with a first scanning unit capable of scanning a bar-type one-dimensional code and a second scanning unit capable of scanning a two-dimensional code configured with an image, and any one of the first scanning unit and the second scanning unit may be coupled with the main body.

In addition, according to an embodiment of the present disclosure, the fingerprint information of a user having a right to use the barcode scanner is matched with the user information and the matched result may be registered in the server.

In addition, according to an embodiment of the present disclosure, previously registered fingerprint information may register a finger used primarily by the user as main fingerprint information, and register fingerprints of remaining fingers as sub-fingerprint information for a predetermined number of times.

In addition, according to an embodiment of the present disclosure, the server may perform authentication based on the main fingerprint information, and when the authentication of the main fingerprint information fails, the server may perform the authentication by receiving further the sub-fingerprint information.

In addition, according to an embodiment of the present disclosure, after the authentication completion information is received, a type of the scan module of the scanning unit being coupled with the main body may be recognized, and the type of the recognized scan module may be displayed on the display module.

In addition, according to an embodiment of the present disclosure, when the scanning unit is not mounted on the main body, a message to induce mounting of the scanning unit may be displayed on the display module.

In addition, according to an embodiment of the present disclosure, after the authentication completion information is received, when a beam of the scan is not activated within a predetermined time, a scan process is stopped and the re-authentication request message is displayed on the display module.

In addition, according to an embodiment of the present disclosure, after the beam of the scan is activated, when the scan is not performed within a predetermined time, activation of the beam of the scan may be stopped and the re-authentication request message may be displayed on the display module.

In addition, according to an embodiment of the present disclosure, when the fingerprint information that does not match the fingerprint information previously registered as the user is provided to the server, the server may receive generated authentication error information, stop the scan process, and display an authentication error message on the display module.

In addition, according to an embodiment of the present disclosure, a message requesting inputting of the fingerprint information of another finger may be additionally displayed on the display module, and when the fingerprint information is not received within a predetermined time, the scan process may be stopped.

In addition, according to an embodiment of the present disclosure, by coupling the fingerprint recognition module and the operation module, the recognition of the fingerprint information may be completed and the beam of the scan may be activated at the same time, and while a finger of the user is attached on the operation module, the beam of the scan may be activated.

In addition, according to an embodiment of the present disclosure, the server may provide authentication details of the user and barcode recognition contents performed in response to the user to a predetermined administrator terminal according to administrator's request query.

In addition, according to an embodiment of the present disclosure, the server may map the barcode and additional information and store the mapped result as product history information whenever the additional information on a product corresponding to the barcode is received after recognition of the barcode.

In addition, according to an embodiment of the present disclosure, a coupling structure of the scanning unit may be implemented as a hooking structure and a coupling structure of the main body may be implemented as a structure which can correspond to the hooking structure, and an electrical connection unit may be provided in a connector portion of the hooking structure, and when the scanning unit and the main body are coupled, they may be connected through the electrical connection unit, the scanning unit may receive power from the main body, and the scanning unit may receive the scanned barcode information to the main body.

In addition, according to another embodiment of the present disclosure, a barcode scanner system operated through fingerprint authentication by a user includes a barcode scanner which recognizes fingerprint information of a user through a fingerprint recognition module, performs authentication by transmitting the fingerprint information to a server, performs barcode scan in a case where there is an input of the user on the operation module, when the authentication completion information is received from the server, and transmits the barcode information to the server; and a server receives the fingerprint information recognized through the fingerprint recognition module by the barcode scanner, performs authentication of the fingerprint information, and transmits a result of the authentication to the barcode scanner.

According to the above-described problem solving means of the present disclosure, a barcode scanner may be used by identifying a user through fingerprint authentication according to an embodiment of the present disclosure. In addition, since a prerequisite work required to switch a module is reduced by switching a scanning module, it is possible to enable rapid work in an industrial field.

DETAILED DESCRIPTION OF THE EMBODIMENTS

Figure 1:
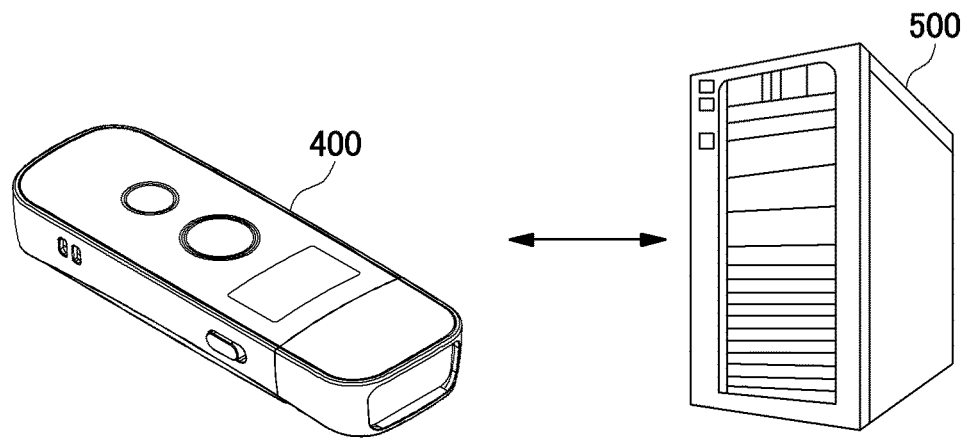
FIG. 1 is a diagram illustrating a system structure for operating a barcode scanner operated through fingerprint authentication of a user according to an embodiment of the present disclosure.

Hereinafter, embodiments of the present disclosure will be described in detail with reference to the accompanying drawings so that those of ordinary skill in the art can easily implement the present disclosure. However, the present disclosure may be implemented in various different forms and is not limited to the embodiments described herein. In the drawings, parts irrelevant to the description are omitted in order to clearly describe the present disclosure, and similar reference numerals are attached to similar parts throughout the specification.

Throughout the specification, when a part is said to be "connected" with another part, this includes not only "directly connected" but also "electrically connected" with another element in the middle. In addition, when a part is said to "include" a certain component, it means that other components may be further included, rather than excluding other components unless specifically stated to the contrary, and it is to be understood that the possibility of the presence or addition of one or more other features or numbers, steps, actions, elements, parts, or combinations thereof is not preliminarily excluded.

The following examples are detailed descriptions for aiding understanding of the present disclosure, and do not limit the scope of the present disclosure. Therefore, the invention of the same scope performing the same function as the present disclosure will also belong to the scope of the present disclosure.

FIG. 1 is a diagram illustrating a system structure for operating a barcode scanner operated through fingerprint authentication of a user according to an embodiment of the present disclosure.

Referring to FIG. 1, a system may include a barcode scanner 400 and a server 500, and they may be interconnected through a communication network.

The barcode scanner 400 transmits fingerprint information recognized from a user to the server 500, and the server 500 performs authentication on the fingerprint information.

Hereinafter, when authentication completion information is transmitted to the barcode scanner 400 based on a result of the authentication, the barcode scanner scans a barcode based on a user's operation.

The barcode scanner 400 may be configured to include a scanning unit including a scan module for scanning the barcode on one side and having a coupling structure with a main body on the other side, and the main body having a shape corresponding to the coupling structure of the scanning unit on one side and including a display module, a communication module, an operation module, and a fingerprint recognition module.

At this time, the scanning unit of the barcode scanner 400 is configured with a first scanning unit capable of scanning a bar-type one-dimensional code and a second scanning unit capable of scanning an image-type two-dimensional code.

A typical one-dimensional code is the barcode and the two-dimensional code is a quick response (QR) code.

Accordingly, a user uses one of the first scanning unit and the second scanning unit corresponding to a type of the bar code the user wants to scan in combination with the body unit.

In order to implement a system, the server 500 previously stores a result obtained by matching the fingerprint information on the user of the barcode scanner 400 and user information. Thereafter, when the user uses the barcode scanner 400, it is checked whether the user has the right to use the barcode scanner 400 through a work that the fingerprint information received from the barcode scanner 400 is compared with the previously stored fingerprint information.

Since the user has the right to use the barcode scanner 400, when the authentication is completed, a server 500 generates the authentication completion information, transmits the generated result to the barcode scanner 400, and receives the scanned barcode.

Meanwhile, a communication network serves to connect the barcode scanner 400 and the server 500. That is, the communication network refers to a communication network providing a connection path such that the barcode scanner 400 may transmit and receive data after the server 500 is accessed. For example, the communication network is a wired network such as Local Area Network (LAN), Wide Area Network (WAN), Metropolitan Area Network (MAN), and Integrated Service Digital Network (ISDN), or a wireless network such as wireless LAN, CDMA, Bluetooth, and satellite communication, but the scope of the present disclosure is not limited thereto.

Figure 2:
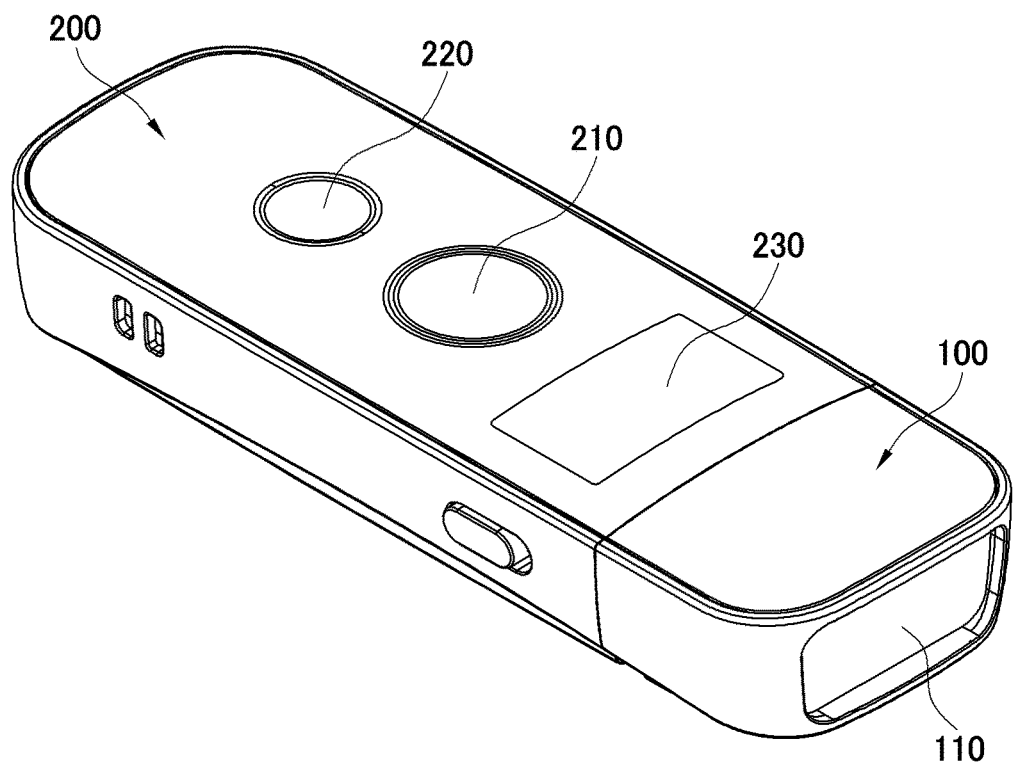
FIG. 2 is a perspective view illustrating the appearance of the barcode scanner operated through the fingerprint authentication of the user according to an embodiment of the present disclosure.
Figure 3:
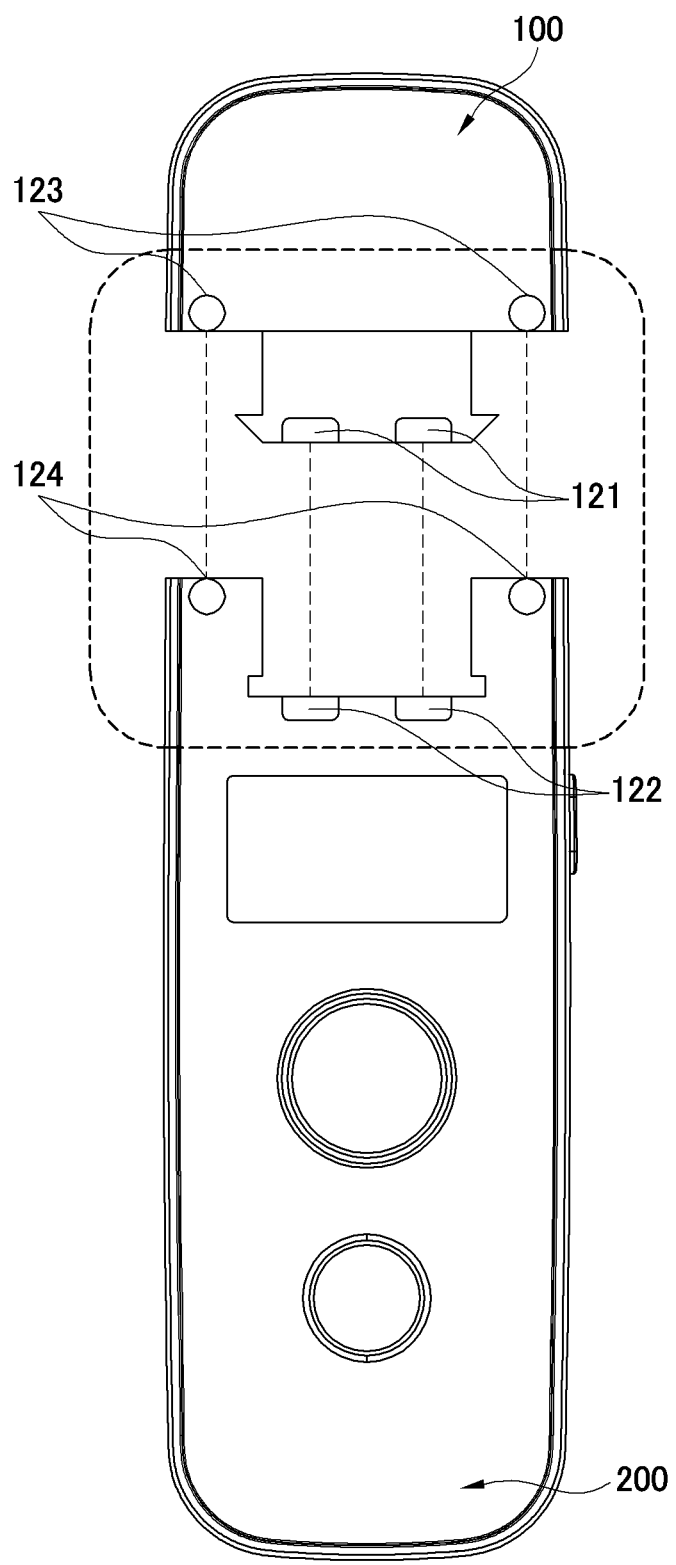
FIG. 3 is a front view illustrating the appearance of the barcode scanner operated through the fingerprint authentication of the user according to an embodiment of the present disclosure.

FIG. 2 to FIG. 3 are a perspective view and a front view illustrating the appearance of the barcode scanner operated through the fingerprint authentication of the user according to an embodiment of the present disclosure.

The appearance and size of the barcode scanner 400 are not limited to the scope of the present disclosure because it may be implemented in a form suitable for carrying and scanning by the user. However, as illustrated in FIG. 2 and FIG. 3, a form such as a remote controller that a person may hold and use in one hand is recommended.

First, referring to FIG. 2, as a perspective view of the barcode scanner 400 in which a scanning unit 100 and a main body 200 are coupled with each other, the scanning unit 100 may include a light source unit 110, and the main body 200 may include a fingerprint recognition button 210, a scan activation button 220, and a display window 230.

The light source unit 110 provided in the scanning unit 100 may be a device that scans the barcode by irradiating a scan beam.

The light source unit 110 in the drawing is located on the front side of the barcode scanner 400 but may be implemented on a lower surface or a side surface as necessary, and may be configured in plural.

The fingerprint recognition button 210 of the main body 200 is a button for recognizing a fingerprint of a user, and fingerprint recognition is automatically performed when a user places a finger on the fingerprint recognition button 210 after the barcode scanner 400 is activated.

The scan activation button 220 may be a button that the user presses to activate a scan beam after the fingerprint recognition is completed.

At this time, a form where when the scan activation button 220 is pushed once, the scan beam is activated, and when pressed again, the scan beam is turned off, may be implemented. In addition, the scan beam may be activated only while the user presses the scan activation button 220.

The display window 230 may be a display screen for notifying the user of a progress of the scan. The method of providing information to the user may be provided by directly displaying a language corresponding to each step or by displaying a predetermined message.

FIG. 3 is a front view of the barcode scanner 400 from which the scanning unit 100 and the main body 200 are separated, and a coupling structure 120 of the scanning unit 100 and the main body 200 may be confirmed.

As an alternative embodiment, the coupling structure 120 may be implemented in a form of a hooking structure. In detail, the coupling structure 120 of the scanning unit 100 is implemented as the hooking structure and the main body 200 has a structure corresponding thereto.

At this time, a first connection portion 121 electrically connected to the main body 200 may be provided in a connector portion of the hooking structure provided in the scanning unit 100, and a second connection portion 122 that contacts the first connection portion 121 and transmits a signal, may also be provided in the main body 200.

Accordingly, when the scanning unit 100 and the main body 200 are coupled with each other, the first connection portion 121 may be connected to the second connection portion 122, and the scanning unit 100 may receive power from the main body 200 or barcode information scanned by the scanning unit 100 may be transmitted to the main body 200.

In addition, an auxiliary connection portion that assists a coupling may be provided in the coupling structure 120 of the scanning unit 100 and the main body 200 in addition to the hooking structure.

A first auxiliary connection portion 123 is provided in the scanning unit 100, and a second auxiliary connection portion 124 corresponding thereto is provided in the main body 200.

At this time, the first auxiliary connection portion 123 and the second auxiliary connection portion 124 may be implemented in a structure such as a magnet and a groove/protrusion. Through this, not only increases the coupling force of the coupling structure 120, but also serves to guide the scanning unit 100 to be coupled to the correct position.

Figure 4:
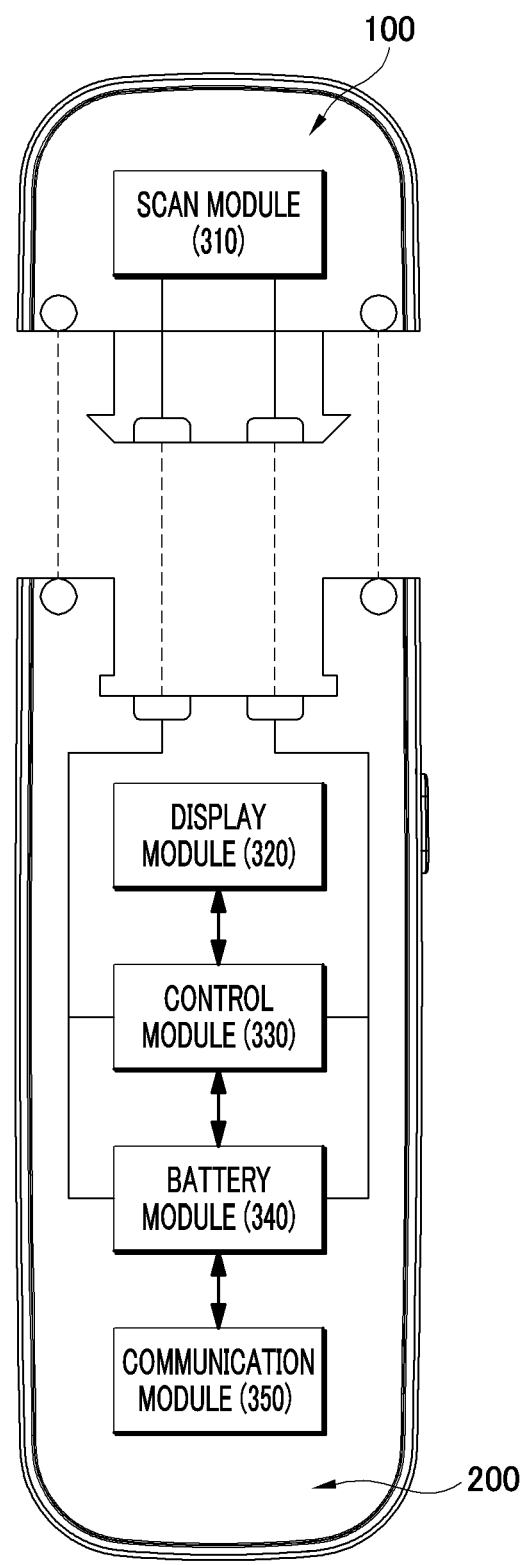
FIG. 4 is a diagram illustrating a structure of an inner module of the barcode scanner according to an embodiment of the present disclosure.

FIG. 4 is a diagram illustrating a structure of an inner module of the barcode scanner according to an embodiment of the present disclosure.

In FIG. 4, a module configuring the barcode scanner 400 may include a scan module 310, a display module 320, a control module 330, a battery module 340, and a communication module 350.

First, the scan module 310 included in the scanning unit 100 processes the barcode recognized by the light source unit 110 and transmits the processed result to the main body 200.

At this time, as described above, the scan module 310 may be divided into the first scanning unit capable of scanning a bar-type one-dimensional code and the second scanning unit capable of scanning a two-dimensional code configured with images.

Accordingly, the user selects one of the first scanning unit or the second scanning unit corresponding to the code the user wants to scan and attaches the scanning unit to the main body 200 to use.

The display module 320 may be a module that determines the current state of the barcode scanner 400 or a scanning progress state to display on the display window 230.

The control module 330 is a kind of central processing unit and controls the entire process of operating the barcode scanner operated through the fingerprint authentication of the user. Each step performed by the control module 330 will be described below with reference to FIG. 5.

Here, the control module 330 may include all kinds of devices capable of processing data, such as a processor. Here, for example, the processor may refer to a data processing device embedded in hardware, which has a circuit physically structured to perform a function represented by a code or command included in a program. As an example of a data processing device built into the hardware as described above, there are a microprocessor, a central processing unit (CPU), a processor core, a multiprocessor, an application-specific integrated circuit (ASIC), a field programmable gate array (FPGA), and the like, but the scope of the present disclosure is not limited thereto.

The battery module 340 may control power for operating the barcode scanner 400 and may provide power required for operating the scanning unit 100.

In addition, by transmitting the current status of the remaining battery to the display module 320, the user may check the battery status of the barcode scanner 400.

As a further embodiment, when the barcode scanner 400 is a streamlined type receiving power in real time, it may perform a role of adjusting voltage/current.

The communication module 350 provides a communication interface required for providing transmission and reception signals between the barcode scanner 400 and the server 500 in a form of packet data by interworking with the communication network. Furthermore, the communication module 350 may perform a role of receiving a data request from each device and transmitting data as a response thereto.

Here, the communication module 350 may be a device including hardware and software necessary to transmit and receive signals such as control signals or data signals through wired or wireless connection with other network devices.

Figure 5:
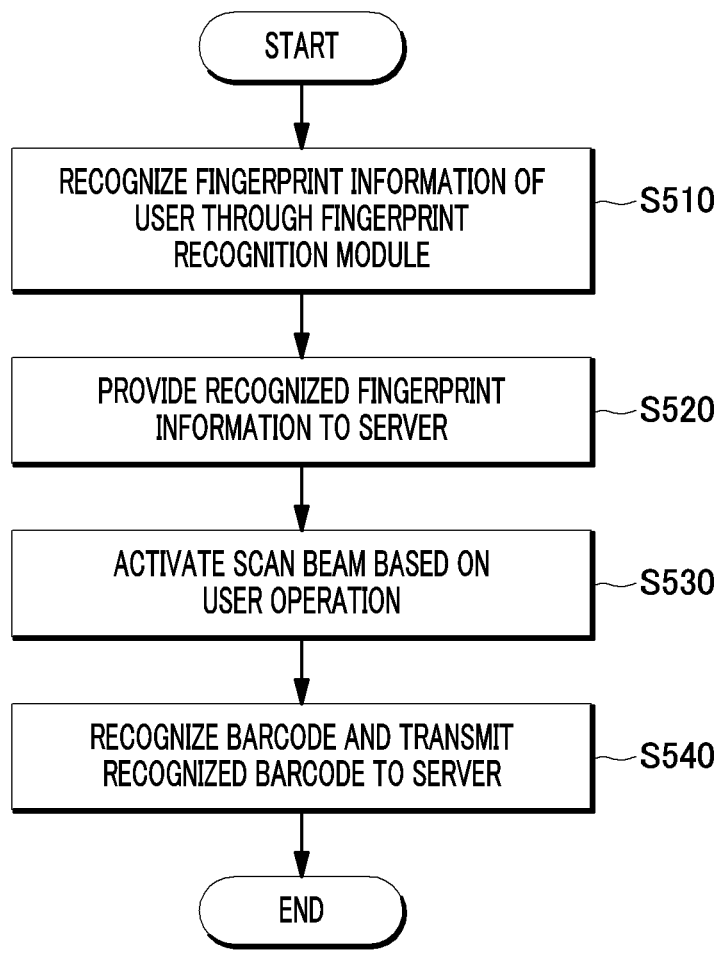
FIG. 5 is an operation flowchart representing a process of scanning the barcode according to an embodiment of the present disclosure.

FIG. 5 is an operation flowchart representing a process of scanning the barcode according to an embodiment of the present disclosure.

Referring to FIG. 5, the fingerprint information of a user is recognized through the fingerprint recognition module (S510).

After the user turns on the barcode scanner 400, the fingerprint information is recognized by the barcode scanner 400 by placing a finger of which the fingerprint is registered on the fingerprint recognition button 210.

At this time, when the fingerprint recognition button 210 is implemented with a technology such as a pressure-sensitive type, a finger placed on the button may be automatically recognized, and when implemented as a physical button, the fingerprint is recognized only in a case where the fingerprint recognition button 210 is pressed.

The barcode scanner 400 recognizing the fingerprint information from the user provides the recognized fingerprint information to the server 500 (S520).

In detail, when authentication is successful, the barcode scanner 400 receives the authentication completion information from the server 500 and displays an authentication success message informing that the authentication is completed on the display window 230.

Thereafter, the scan module 310 of the scanning unit 100 coupling with the main body 200 may recognize a type of whether it is the first scanning unit or the second scanning unit, and may displays the type of the scan module 310 on the display window 230 to notify the user.

When the scanning unit 100 is not mounted on the main body 200, a message for inducing the installation of the scanning unit 100 may be displayed on a display window 230 (display module 320) to notify the user.

In addition, when the fingerprint information that does not match the previously registered fingerprint information as the user, is provided to the server 500, the barcode scanner 400 receives the authentication error information from the server 500, and stops a scan process.

At this time, the authentication error message is displayed through the display window 230 to inform the user that the scan is stopped.

In a case of a system in which a plurality of fingerprints are registered for one user, it is possible to induce inputting of the fingerprint information of the user by additionally displaying a message requesting inputting of fingerprint information of another finger on the display window 230.

At this time, when the fingerprint information is not received from the user within a predetermined time, the barcode scanner 400 automatically stops the scan process.

In order to implement a step S530, a process in which the authentication is performed will be described in detail with reference to FIG. 5 to be described below.

The scan beam is activated based on a user operation of the barcode scanner 400 (S530).

In order to activate the scan beam of the barcode scanner 400, the scan is performed by operating the scan activation button 220 of the operation module.

At this time, after authentication information is received, when the scan beam is not activated within a predetermined time, the scan process is stopped and the re-authentication request message is displayed on the display window 230.

This may be a function to save a battery by automatically turning off the barcode scanner 400 when the user inevitably fails to perform the scan or when the authentication is performed by accidentally inputting a fingerprint.

In addition, when the scan is not performed within a predetermined time after the scan beam is activated, activation of the scan beam may be automatically stopped and a re-authentication request message may be displayed on the display window 230.

In addition, when a structure in which the fingerprint recognition module and the operation module of the barcode scanner 400 are coupled with each other, is provided, the recognition of the fingerprint information is completed and, at the same time, the scan beam may be activated. Only while a user's finger is attached to the operation module, it is possible to set to activate the scan beam. That is, the fingerprint recognition button 210 and the scan activation button 220 are unified as a single button to input the button and simultaneously perform the authentication and activate the scan beam.

Through step S530, the barcode is recognized and the recognized barcode is transmitted to the server 500 (S540).

In step S530, a user recognizes the barcode by applying the scan beam to the barcode and transmits it to the server 500.

Figure 6:
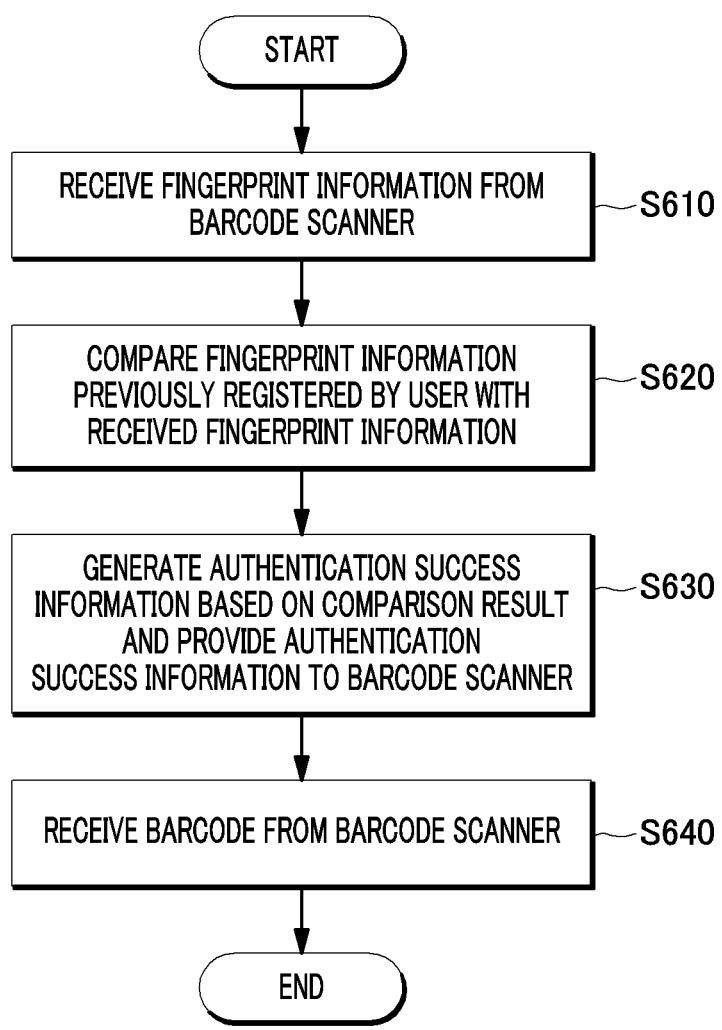
FIG. 6 is an operation flowchart representing a scan process performed by a server according to an embodiment of the present disclosure.

FIG. 6 is an operation flowchart representing the scan process performed by the server according to an embodiment of the present disclosure.

Referring to FIG. 6, the server 500 receives the fingerprint information from the barcode scanner 400 (S610).

The fingerprint information previously registered by the user and the received fingerprint information are compared (S620).

The fingerprint information of a user having a right to use the barcode scanner 400 has to be previously stored in the server 500. At this time, since many people may use one barcode scanner 400, identified user information and the fingerprint information are matched and the matched result is stored.

In addition, in order to register the fingerprint information, the first fingerprint recognized through the fingerprint recognition module of the barcode scanner 400 may be transmitted and registered to the server 500, or the server 500 may receive the fingerprint information recognized by another fingerprint recognition device, match the recognized result and the user information, and store the matched result.

At this time, as for the previously registered fingerprint information of the user, a finger mainly used by the user may be registered as main fingerprint information, and fingerprints of the remaining fingers may be additionally registered as sub-fingerprint information for a predetermined number of times. This is, in general, to proceed the authentication by further receiving the sub-fingerprint information when the authentication of the main fingerprint information fails, while the server 500 performs the authentication based on the main fingerprint information.

In addition, when the fingerprint information is not received within a predetermined time after the authentication fails, it is determined that the user does not scan, and the scan process is stopped.

Based on a comparison result proceeded through step S620, authentication success information is generated and the authentication success information is provided to the barcode scanner 400 (S630).

In addition, in step S630, when the server 500 receives the fingerprint information that does not match the fingerprint information registered previously as the user from the barcode scanner 400, the server 500 generates the authentication error information and transmits the generated information to the barcode scanner 400.

Finally, the barcode is received from the barcode scanner 400 (S640).

Through step S640, the user information and the barcode information which are identified, are matched and the matched result is stored.

To explain this in detail, the server 500 is performed in response to user's authentication details and the user received through step S630 according to a user's request query set as an administrator, but matches barcode recognition contents and stores the matched result.

At this time, matched and stored information is provided to the manager terminal such that it is possible to check what the user is scanned.

After the barcode is recognized, whenever additional information on a product corresponding to the barcode is additionally received, the server 500 maps the barcode and the additional information to store product history information.

By doing so, even if the information of the product corresponding to a bar code list scanned by a user is not input, and a result obtained by automatically matching them is stored.

Through the process additionally described in step S640, the administrator may inquire about which product barcode information is recognized by the user.

The above description of the present disclosure is for illustrative purposes only, and those of ordinary skill in the art to which the present disclosure pertains will be able to understand that other specific forms can be easily modified without changing the technical spirit or essential features of the present disclosure. Therefore, it should be understood that the embodiments described above are illustrative and non-limiting in all respects. For example, each component described as a single type may be implemented in a distributed manner, and similarly, components described as being distributed may also be implemented in a combined form.

The scope of the present disclosure is indicated by the claims to be described later rather than the detailed description, and all changes or modified forms derived from the meaning and scope of the claims and their equivalent concepts should be interpreted as being included in the scope of the present disclosure.

What is claimed is:

1. A barcode scanner operated through fingerprint authentication by a user, comprising:
   a scanning unit including a scan module for scanning a barcode on one side and having a coupling structure with a main body on the other side; and
   the main body having a shape corresponding to the coupling structure of the scanning unit on one side and including a display module, a communication module, an operation module, and a fingerprint recognition module,
   wherein the main body recognizes fingerprint information of a user through the fingerprint recognition module, performs authentication by transmitting the fingerprint information to server, performs barcode scan in a case where an input is generated to the operation module of the user after authentication completion information is received from the server, and transmits scanned barcode information to the server, and
   the server matches user information identified through recognition of the fingerprint information with the scanned barcode information and stores the matched result,
   wherein, when the fingerprint information that does not match the fingerprint information previously registered as the user is provided to the server, the server receives generated authentication error information, stops a scan process, and displays an authentication error message on the display module.

2. The barcode scanner operated through fingerprint authentication by a user of claim 1, wherein
   the scanning unit is provided with a first scanning unit capable of scanning a bar-type one-dimensional code and a second scanning unit capable of scanning a two-dimensional code configured with an image, and
   any one of the first scanning unit and the second scanning unit is coupled with the main body.

3. The barcode scanner operated through fingerprint authentication by a user of claim 1, wherein
   the fingerprint information of a user having a right to use the barcode scanner is matched with the user information and the matched result is registered in the server.

4. The barcode scanner operated through fingerprint authentication by a user of claim 3, wherein
   previously registered fingerprint information registers a finger used primarily by the user as main fingerprint information, and registers fingerprints of remaining fingers as sub-fingerprint information for a predetermined number of times.

5. The barcode scanner operated through fingerprint authentication by a user of claim 4, wherein
the server performs authentication based on the main fingerprint information, and
when the authentication of the main fingerprint information fails, the server performs the authentication by receiving further the sub-fingerprint information.

6. The barcode scanner operated through fingerprint authentication by a user of claim 1, wherein
after the authentication completion information is received,
a type of the scan module of the scanning unit being coupled with the main body is recognized, and the type of the recognized scan module is displayed on the display module.

7. The barcode scanner operated through fingerprint authentication by a user of claim 6, wherein
when the scanning unit is not mounted on the main body, a message to induce mounting of the scanning unit is displayed on the display module.

8. The barcode scanner operated through fingerprint authentication by a user of claim 1, wherein
after the authentication completion information is received,
when a beam of the scan is not activated within a predetermined time, a scan process is stopped and the re-authentication request message is displayed on the display module.

9. The barcode scanner operated through fingerprint authentication by a user of claim 8, wherein
after the beam of the scan is activated,
when the scan is not performed within a predetermined time, activation of the beam of the scan is stopped and the re-authentication request message is displayed on the display module.

10. The barcode scanner operated through fingerprint authentication by a user of claim 1, wherein
a message requesting inputting of the fingerprint information of another finger is additionally displayed on the display module, and when the fingerprint information is not received within a predetermined time, the scan process is stopped.

11. The barcode scanner operated through fingerprint authentication by a user of claim 1, wherein
by coupling the fingerprint recognition module and the operation module, the recognition of the fingerprint information is completed and a beam of the scan is activated at the same time, and while a finger of the user is attached on the operation module, the beam of the scan is activated.

12. The barcode scanner operated through fingerprint authentication by a user of claim 1, wherein
the server provides authentication details of the user and barcode recognition contents performed in response to the user to a predetermined administrator terminal according to administrator's request query.

13. The barcode scanner operated through fingerprint authentication by a user of claim 1, wherein
the server maps the barcode and additional information and stores the mapped result as product history information whenever the additional information on a product corresponding to the barcode is received after the barcode is recognized.

14. The barcode scanner operated through fingerprint authentication by a user of claim 1, wherein
a coupling structure of the scanning unit is implemented as a hooking structure and a coupling structure of the main body is implemented as a structure which can correspond to the hooking structure, and
an electrical connection unit is provided in a connector portion of the hooking structure, and when the scanning unit and the main body are coupled, they are connected through the electrical connection unit, the scanning unit receives power from the main body, and the scanning unit receives the scanned barcode information to the main body.

15. A barcode scanner system operated through fingerprint authentication by a user, comprising:
a barcode scanner which recognizes fingerprint information of a user through the fingerprint recognition module, performs authentication by transmitting the fingerprint information to a server, performs barcode scan in a case where there is an input of the user on an operation module, when the authentication completion information is received from the server, and transmits scanned barcode information to the server; and
the server which receives the fingerprint information recognized through the fingerprint recognition module by the barcode scanner, performs authentication of the fingerprint information, and transmits a result of the authentication to the barcode scanner,
wherein, when the fingerprint information that does not match the fingerprint information previously registered as the user is provided to the server, the server receives generated authentication error information, stops a scan process, and displays an authentication error message on a display module.

* * * * *